W. V. TURNER.
COMBINED VACUUM AND COMPRESSED AIR BRAKE.
APPLICATION FILED AUG. 22, 1918.
1,339,678.
Patented May 11, 1920.
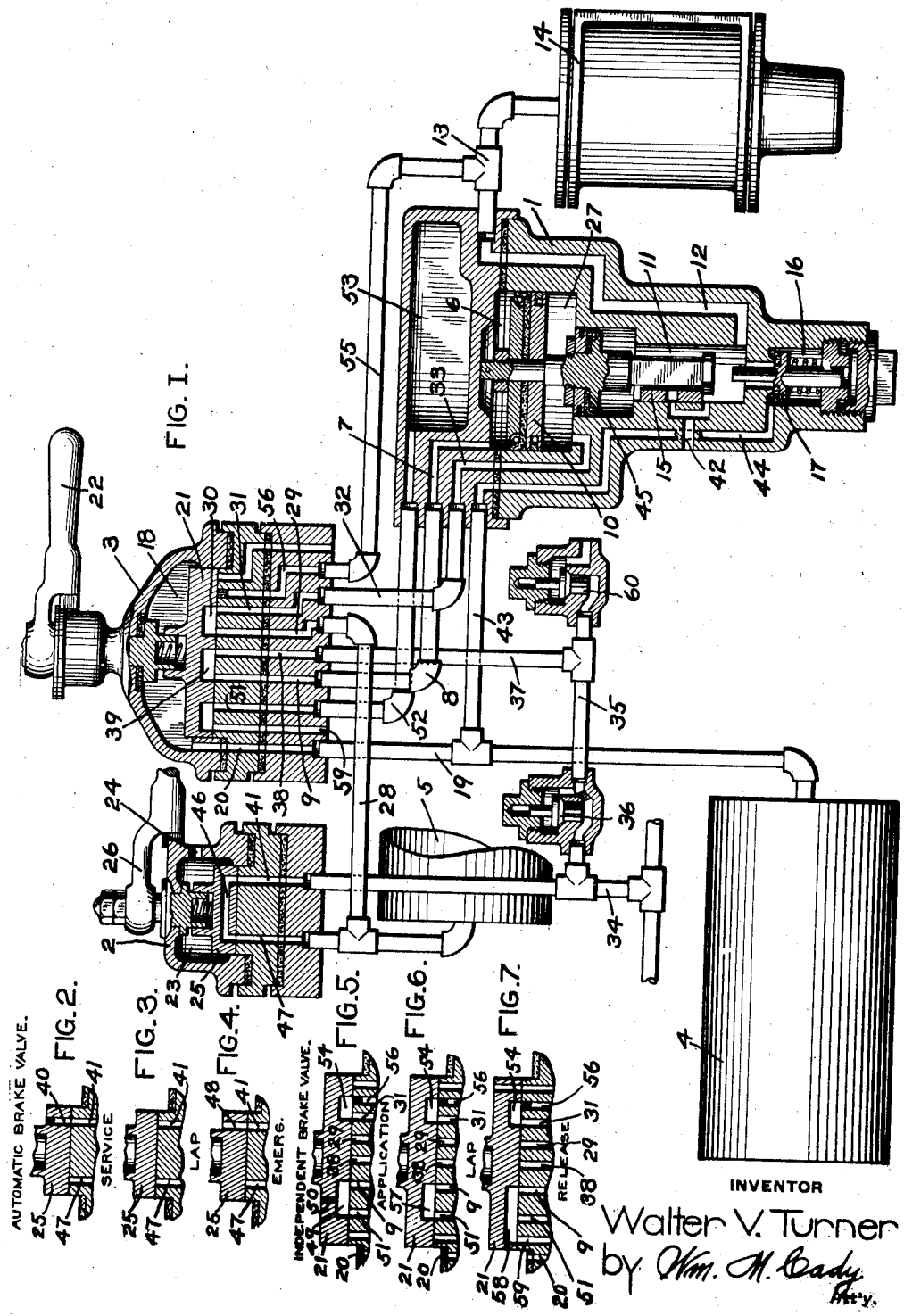
INVENTOR
Walter V. Turner
by Wm. M. Cady
Atty.

UNITED STATES PATENT OFFICE.

WALTER V. TURNER, OF WILKINSBURG, PENNSYLVANIA, ASSIGNOR TO WESTINGHOUSE AIR BRAKE COMPANY, OF WILMERDING, PENNSYLVANIA, A CORPORATION OF PENNSYLVANIA.

COMBINED VACUUM AND COMPRESSED-AIR BRAKE.

1,339,678.   Specification of Letters Patent.   Patented May 11, 1920.

Application filed August 22, 1918. Serial No. 250,937.

*To all whom it may concern:*

Be it known that I, WALTER V. TURNER, a citizen of the United States, residing at Wilkinsburg, in the county of Allegheny and State of Pennsylvania, have invented new and useful Improvements in Combined Vacuum and Compressed-Air Brakes, of which the following is a specification.

This invention relates to fluid pressure brakes, and more particularly to a combined automatic and vacuum brake system.

The principal object of my invention is to provide a brake apparatus of the above character, on which means are provided for controlling the brakes on the locomotive independently of those on the train.

In the accompanying drawing; Figure 1 is a diagrammatic view, with the principal parts in section, of a combined automatic and vacuum brake apparatus for a locomotive, with my invention embodied therein; Figs. 2, 3, and 4 sectional views of the automatic brake valve in the respective positions of service, lap and emergency; and Figs. 5, 6, and 7 sectional views of the independent brake valve in the respective positions of application, lap, and release.

As shown in the drawing, the brake apparatus may comprise a distributing valve device 1, an automatic brake valve 2, an independent brake valve 3, a main reservoir 4, and a vacuum reservoir 5.

The distributing valve device 1 may comprise a casing having a piston chamber 6, connected by passage 7 and pipe 8 to a passage 9 in the independent brake valve 3 and containing a piston 10, a valve chamber 11, connected by passage 12 and pipe 13 to brake cylinder 14, and containing an exhaust valve 15, and a valve chamber 16, containing a valve 17 for controlling communication through which fluid is supplied from the main reservoir 4 to the brake cylinder 14.

The independent brake valve 3 may comprise a casing having a valve chamber 18, connected by pipe 19 and passage 20 to main reservoir 4 and containing a rotary slide valve 21, adapted to be operated by handle 22.

The automatic brake valve 2 may comprise a casing having a rotary valve chamber 23, open to the atmosphere through port 24 and containing a rotary slide valve 25, adapted to be operated by handle 26.

In operation, when the automatic brake valve 2 and the independent brake valve 3 are in running position, as shown in Fig. 1 of the drawing, the chamber 27, below piston 10 of the distributing valve device is connected to the vacuum reservoir 5, through pipe 28, passage 29, cavity 30 in rotary valve 21, passage 31, pipe 32, and passage 33.

The piston chamber 6 is connected to the vacuum brake pipe 34, through pipe 35, containing check valve 36, pipe 37, passage 38, cavity 39 in rotary valve 21, passage 9, pipe 8, and passage 7. The opposite sides of piston 10 are thus normally subject to the partial vacuum carried in the vacuum brake system.

If it is desired to effect an application of the brakes on the train and locomotive, the automatic brake valve handle 26 is turned to application position, as shown in Fig. 2, in which fluid at atmospheric pressure is supplied from valve chamber 23, through port 40 and passage 41 to the vacuum brake pipe 34.

The pressure in the vacuum brake pipe is thus increased and the vacuum brakes on the cars of the train are applied in accordance with the operating principles of the well known vacuum brake.

Fluid at atmospheric pressure is also supplied from the vacuum brake pipe 34 to pipe 35 and flows through pipe 37, passage 38, cavity 39, passage 9, and pipe 8, to piston chamber 6.

Since there is still a partial vacuum in chamber 27, the piston 10 will be operated by the atmospheric pressure supplied to piston chamber 6, so that the exhaust valve 15 is moved to close the exhaust port 42 and the valve 17 is then opened to supply fluid from the main reservoir 4 to the brake cylinder 14, through pipe 43, passage 44, passage 12 and pipe 13.

When the brake cylinder pressure acting on the differential piston 45 has increased to a degree sufficient to overcome the atmospheric pressure acting in chamber 6 on piston 10, the pistons will be moved so as to permit the valve 17 to close.

The brakes may be released by moving the brake valve handle 26 to running position, in which the vacuum brake pipe is connected to the vacuum reservoir 5, through passage 41, cavity 46, in rotary valve 25, and passage 47, so that the vacuum brakes on the train will be released by the reduction in pressure thus produced in the vacuum brake pipe.

If it is desired to effect an emergency application of the brakes, the brake valve handle 26 is turned to emergency position, as shown in Fig. 4 of the drawing, in which a large port 48 registers with passage 41. Fluid from the atmosphere is then rapidly supplied to the vacuum brake pipe to cause an emergency rate of brake application throughout the train.

The brakes may be applied on the locomotive independently of the train brakes by turning the independent brake valve handle 22 to application position, in which the rotary valve 21 assumes the position shown in Fig. 5 of the drawing. In this position, a cavity 49, having a port 50 opening to the rotary valve chamber 18, connects passage 9 with a passage 51, and a pipe 52, leading to the application chamber 53. Fluid from the main reservoir 4 in valve chamber 18 is then supplied to the application chamber 53 and to piston chamber 6, causing the operation of the distributing valve device 1, so as to supply fluid under pressure to the locomotive brake cylinder 14.

A cavity 54 in the rotary valve 21 also connects the brake cylinder 14 with chamber 27, through pipe 55, passage 56, cavity 54, passage 31 and pipe 32, so that the distributing valve device now operates according to the opposing pressures of the brake cylinder and the application chamber.

When the desired pressure is obtained in the locomotive brake cylinder, the independent brake valve is turned to lap position, in which, as shown in Fig. 6 of the drawing, the passages 9 and 51 are still connected together by a cavity 57, so that the pressure previously admitted to the application chamber 53 and piston chamber 6 is held.

The brakes on the locomotive may be released by turning the independent brake valve to release position, as shown in Fig. 7 of the drawing, in which a cavity 58 in rotary valve 21 connects passages 9 and 51 with exhaust port 59. Fluid is therefore exhausted from the application chamber 53 and piston chamber 6, so that the brakes on the locomotive will be released.

Check valve 60 in pipe 35 permits escape of fluid from the piston chamber 6 upon movement of the independent brake valve to running position.

It will now be evident that the brakes on the locomotive and train may be applied and released automatically, by varying the pressure in the vacuum brake pipe, while the brakes on the locomotive may be applied and released independently of the train brakes by straight air control.

Having now described my invention, what I claim as new, and desire to secure by Letters Patent, is:—

1. In a fluid pressure brake, the combination with a vacuum brake pipe adapted to be connected with a train vacuum brake system, of a valve device on the locomotive operated by variations in pressure in the vacuum brake pipe for controlling the brakes on the locomotive, an automatic brake valve for varying the pressure in the vacuum brake pipe, and an independent brake valve for varying the pressure on said valve device.

2. In a fluid pressure brake, the combination with a vacuum brake pipe adapted to be connected with a train vacuum brake system, of an automatic brake valve for varying the pressure in the vacuum brake pipe, a valve device on the locomotive subject to variations in pressure in the vacuum brake pipe for controlling the brakes on the locomotive simultaneously with the train brakes, and an independent brake valve for varying the pressure on said valve device to effect the control of the locomotive brakes by straight air independently of the train brakes.

3. In a fluid pressure brake, the combination with a vacuum brake pipe adapted to be connected with a train vacuum brake system, of a distributing valve device on the locomotive comprising a piston normally subject to the pressure in the vacuum brake pipe and valve means operated by said piston for supplying and releasing fluid to and from the locomotive brake cylinder, an automatic brake valve for varying the pressure in the vacuum brake pipe, and an independent brake valve for supplying and releasing straight air to and from said piston for also operating said valve device.

4. In a fluid pressure brake, the combination with a vacuum brake pipe adapted to be connected with a train vacuum brake system, of a distributing valve device on the locomotive comprising a piston normally subject to the pressure in the vacuum brake pipe and valve means operated by said piston for supplying and releasing fluid to and from the locomotive brake cylinder, an automatic brake valve for varying the pressure in the vacuum brake pipe, and an independent brake valve having a position for cutting off communication from the vacuum brake pipe to said piston and in which fluid under pressure is supplied to said piston.

5. In a fluid pressure brake, the combination with a vacuum brake pipe and a vacuum reservoir, of an automatic brake valve for varying the pressure in the vacuum brake pipe, a valve device for controlling the brakes on the locomotive and having a piston normally subject to the opposing pressures of the vacuum brake pipe and the vacuum reservoir, a brake cylinder, and an independent brake valve for connecting one side of said piston to the brake cylinder and for supplying fluid under pressure to the opposite side.

In testimony whereof I have hereunto set my hand.

WALTER V. TURNER.